Sept. 13, 1927. 1,642,609
G. O. HOWETH
TRANSMISSION GEAR FOR AUTO VEHICLES
Filed Nov. 18, 1925 4 Sheets-Sheet 1
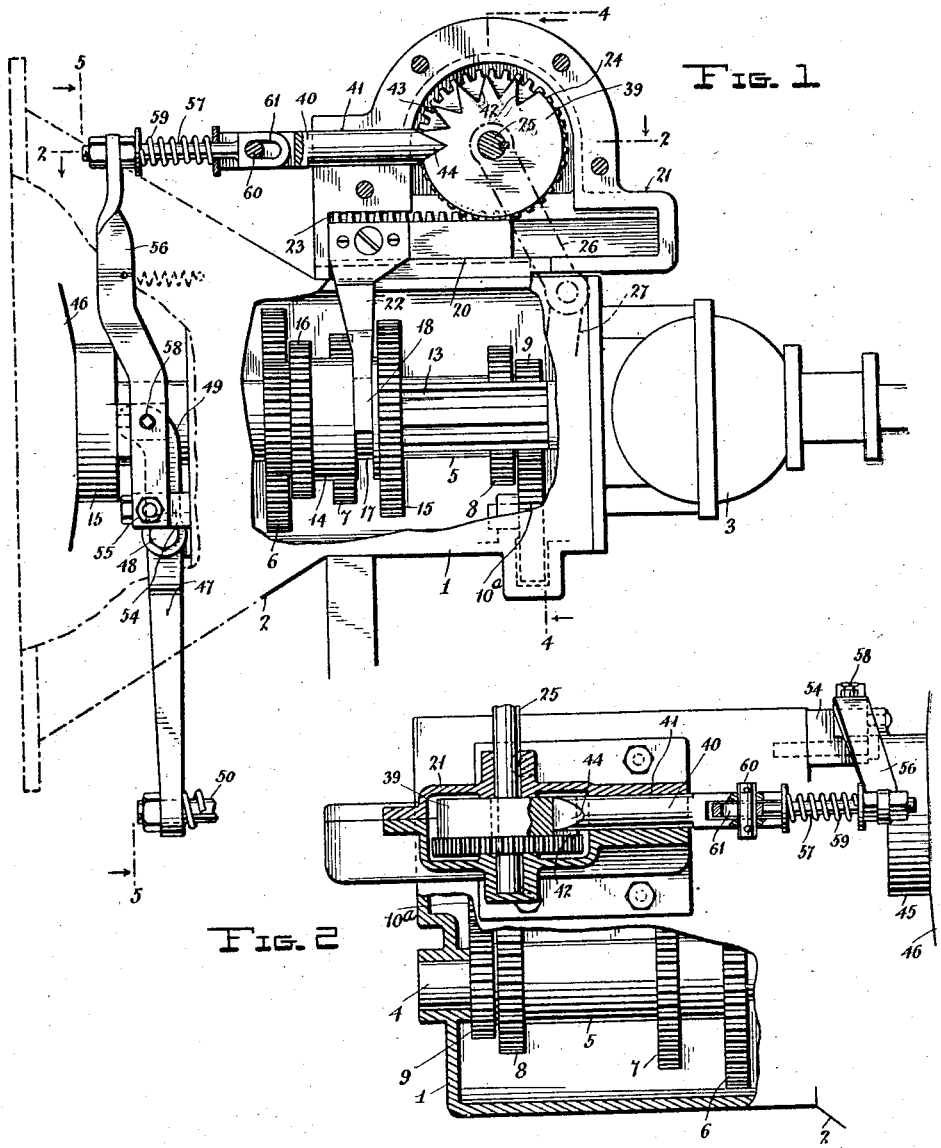
Inventor
George O. Howeth,
By
Attorney Sept. 13, 1927. G. O. HOWETH 1,642,609
TRANSMISSION GEAR FOR AUTO VEHICLES
Filed Nov. 18, 1925 4 Sheets-Sheet 2
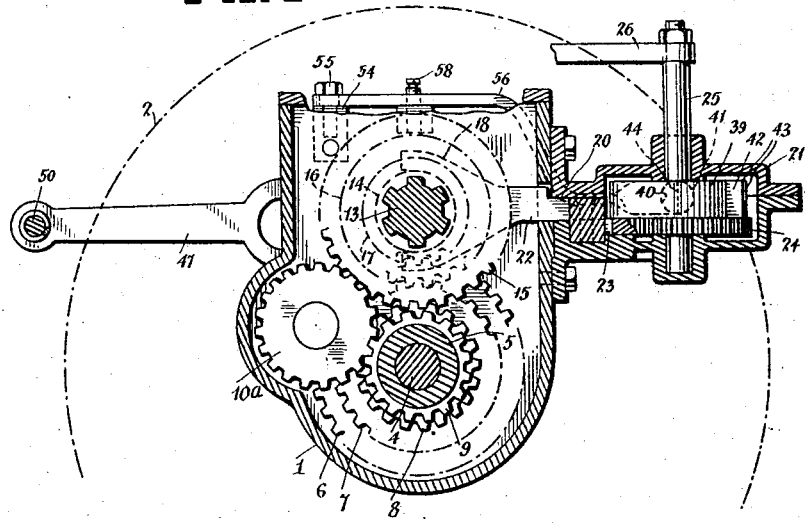
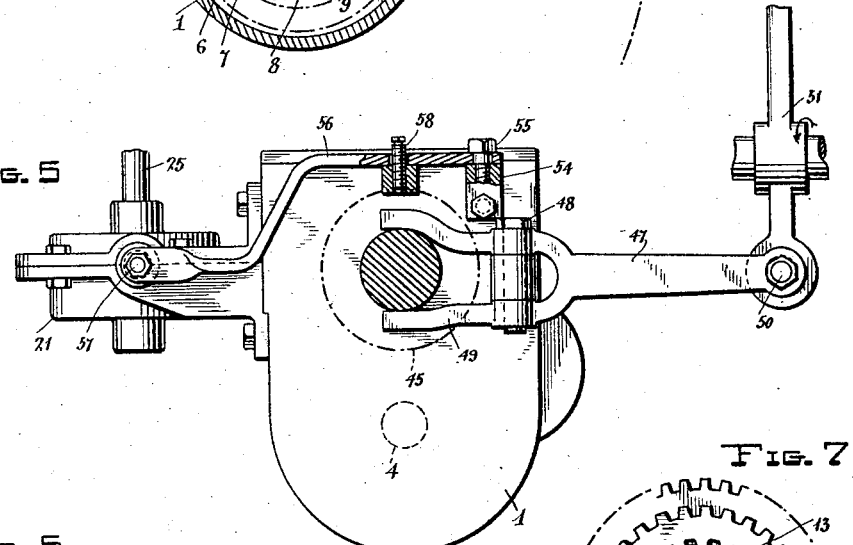
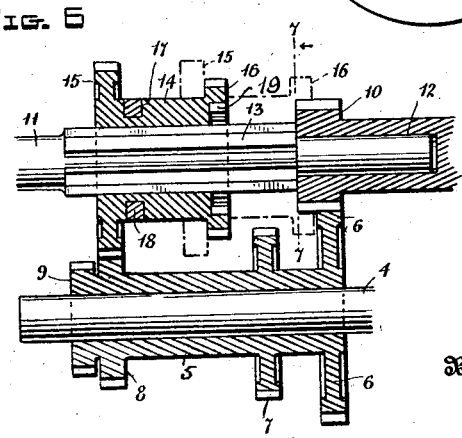
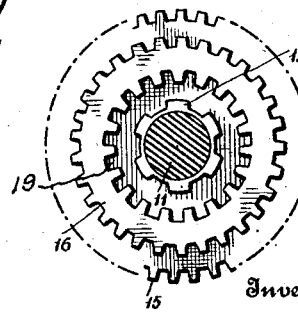
Inventor
George O. Howeth,
By
Attorney

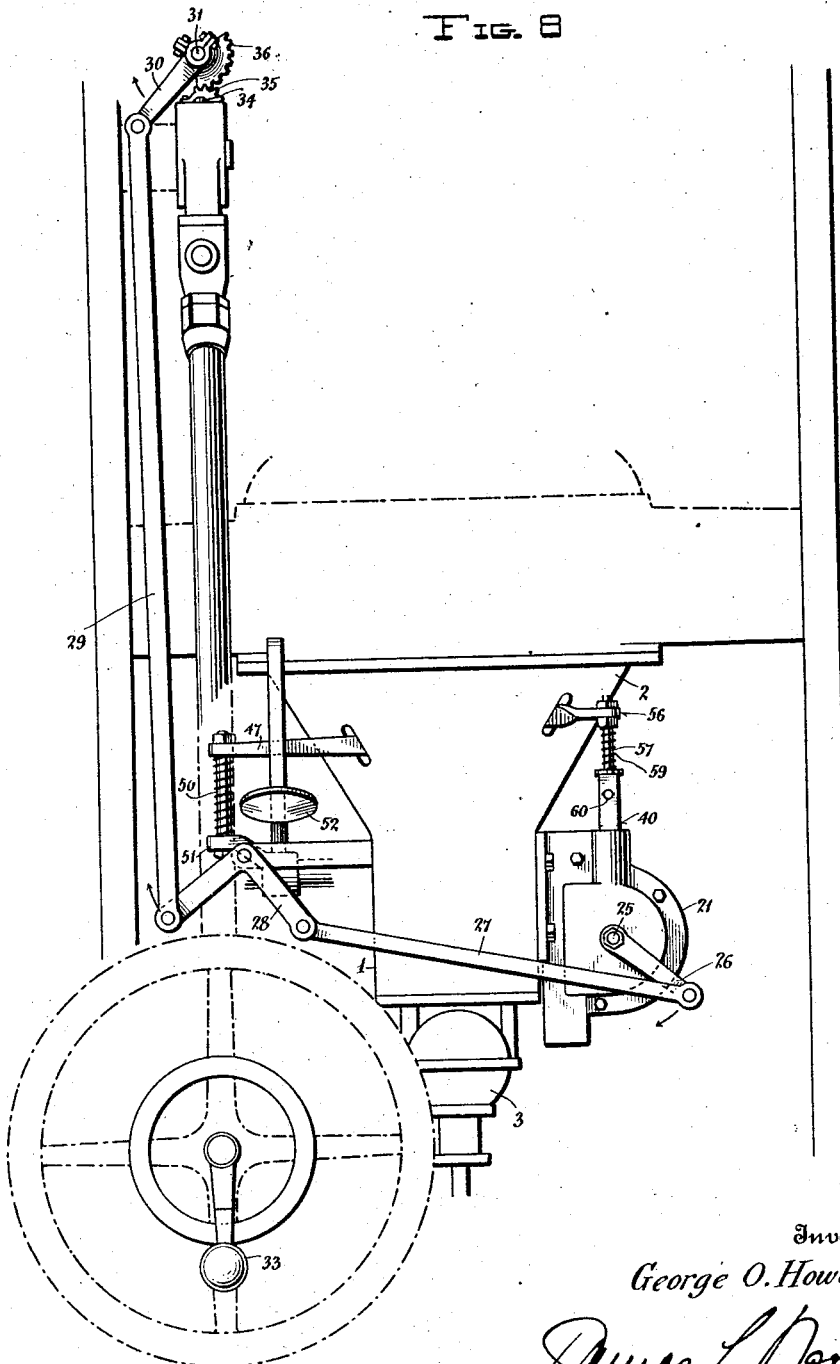

Sept. 13, 1927. 1,642,609
G. O. HOWETH
TRANSMISSION GEAR FOR AUTO VEHICLES
Filed Nov. 18, 1925 4 Sheets-Sheet 4
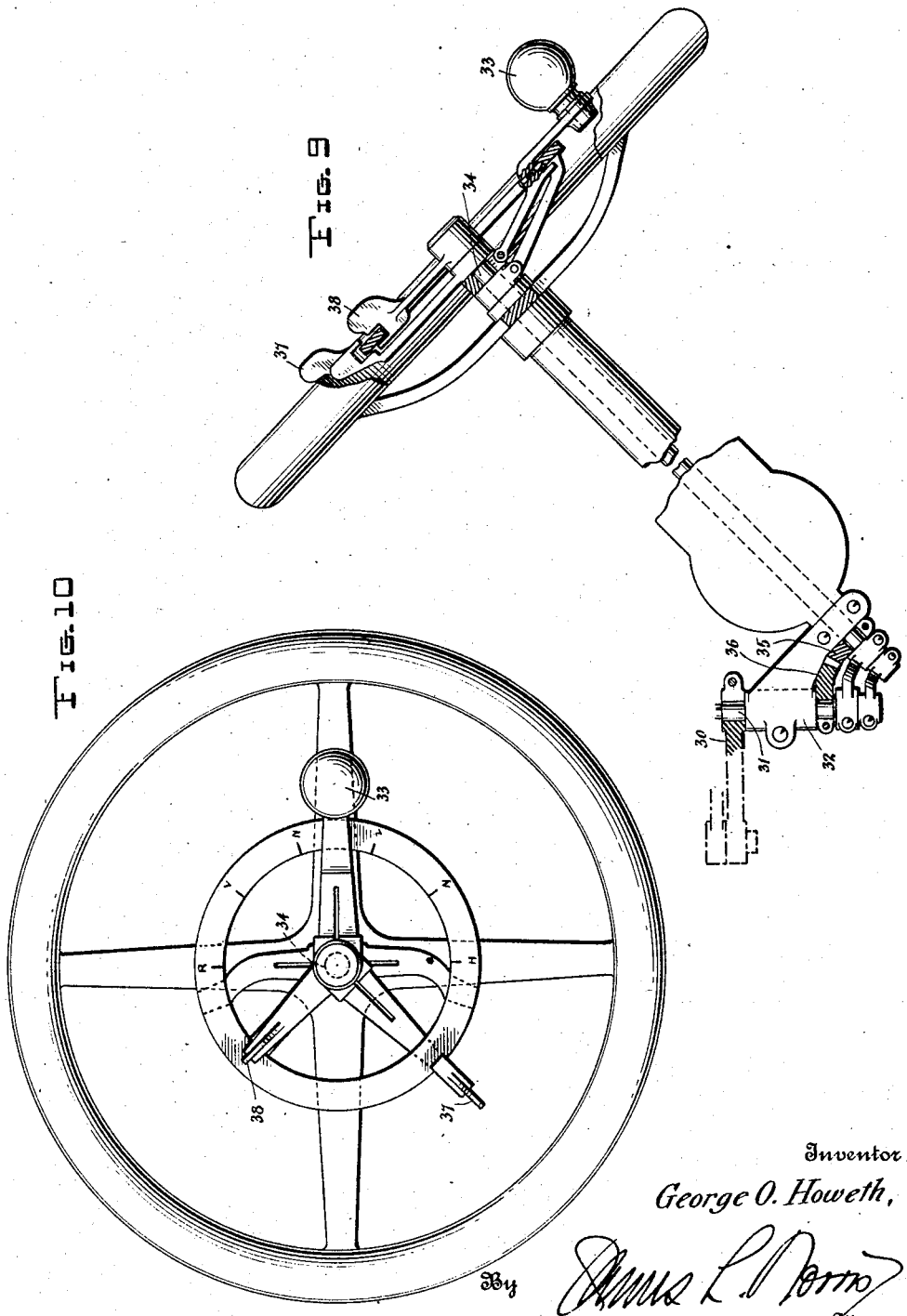
Inventor
George O. Howeth,
By
Attorney Patented Sept. 13, 1927.

1,642,609

UNITED STATES PATENT OFFICE.

GEORGE O. HOWETH, OF MORATTICO, VIRGINIA, ASSIGNOR OF ONE-HALF TO WILLARD D. NEWBILL, OF LANCASTER COUNTY, VIRGINIA.

TRANSMISSION GEAR FOR AUTOVEHICLES.

Application filed November 18, 1925. Serial No. 69,853.

This invention relates to transmission means for auto vehicles and particularly to gear shifting devices of the sliding gear type. The invention proposes the construction of simple and efficient speed-changing mechanism in which the gears are readily changed from one speed ratio to another without clashing, and without its being necessary that the driver should judge the correct relative speeds of the gears about to be enmeshed, prior to making the shift.

The invention further concerns itself with a novel and easily operated gear shifting handle preferably located on the steering post adjacent the steering wheel, arranged so as to effect progressive passage of the gears through all forward speed positions by a continuous arcuate sweep of the shifting handle in one direction, there being a neutral position between each forward speed position through which the gears will pass as the shifting means is continuously actuated. A reverse speed position is preferably located at one end of the arcuate path of movement of said shifting means.

The invention has for its further object the provision of a gear lock so correlated with the clutch and transmission mechanism as to hold the gears locked while the clutch elements are in engagement, and automatically operable, upon declutching, to unlock the gears, said correlated elements including means providing lost motion between the clutch and gear lock, ensuring that the clutch shall be entirely disengaged before the gears are released and that the shifting of the latter shall have been completed before the clutch is thrown in.

With these objects in view, the invention resides in the novel arrangement and combination of elements shown in the drawings, described in the accompanying specification and defined in the appended claims.

Figure 1 is a plan view.

Figure 2 is a section taken along the line 2—2 of Figure 1.

Figure 3 is a view in perspective of the linkage providing lost motion between the gear-lock and clutch operating mechanism.

Figure 4 is a section taken along the line 4—4 of Figure 1.

Figure 5 is a section taken along the line 5—5 of Figure 1.

Figure 6 is a vertical longitudinal section through the gears.

Figure 7 is a section taken along the line 7—7 of Figure 6.

Figure 8 is a plan view showing the clutch and hand controls and the connections therefrom to the gear shifting mechanism.

Figure 9 is a side elevation of the steering post showing the gear shifting lever.

Figure 10 is a plan view of the same.

Referring now in detail to the several figures, the numeral 1 represents the gear box of the power plant of an auto vehicle, 2 being the clutch housing, and 3 the universal joint between the gear box and drive shaft. Within the gear box is journalled a lay shaft 4 carrying a constantly driven sleeve 5 furnished with integral gears 6, 7, 8 and 9, the last named gear being in constant mesh with an idler gear $10^a$, Figure 2, for reversing the motion of the auto vehicle in a manner well known. The gear 6 is in constant mesh with a gear 10, the latter being driven from the engine through the usual clutch, not shown. The structure described up to the present point is conventional in automotive transmission mechanism and it is to be understood that the sleeve 5 with the gears thereupon, and the idler gear $10^a$ are in constant rotation while the clutch is in engaging position, but come to a rest when the clutch is released. The drive shaft 11 enters the gear casing in parallel relation to the lay shaft 4, said shaft being journalled in the usual manner in a recess 12 formed in the gear 10. That part of the drive shaft which passes through the gear box is splined as shown at 13. This also is of usual construction, but the sliding-gear sleeve 14 is integral with the low and intermediate gears 15 and 16 respectively, in contradistinction to the usual type of sliding-gear mechanism in which the low and intermediate gears are carried upon separate sleeves, and shifted independently by different movements of a control lever.

The sliding gear sleeve 14 is formed with an annular channel 17, affording a seat for the operating yoke 18 by means of which the sleeve is slidably shifted along the splined portion of the drive shaft 11. The sliding gears operate to change the speed ratios in such a way that when they are in the position shown in Figure 6, the gear 15 is in mesh with the gear 8 on the sleeve 5, in which position power is transmitted from the gear 10 through the gear 6, the sleeve 5 and gear 8 to the gear 15 and drive shaft 11, the ratios between the gears 8 and 15 imparting a low speed to the auto vehicle. When the gears are shifted so that the gear 15 comes into mesh with the idler gear 10ª, power is communicated from the gear 10 through the gear 6, sleeve 5, gear 9, and idler gear 10ª to the gear 15 and drive shaft 11, the direction of rotation of the latter being changed by the intervention of the idler gear 10ª. When the sliding-gear sleeve 14 is shifted so as to bring the gear 16 into mesh with the gear 7, the drive shaft is in intermediate or second speed. It will be noted that the distance between the gears 15 and 16 on the sliding gear sleeve 14 is less than the distance between the gears 8 and 7 upon the sleeve 5, so that there is a neutral position between the shift from low to high gear, it being impossible for the gears upon the sliding-gear sleeve 14 to be in mesh with two of the gears on the sleeve 5 at the same time. When the sleeve 14 is moved still further to the right as viewed in Figure 6, the gear 16 assumes a neutral position between the gear 7 and the gear 10, and then upon further movement of the sleeve 14 in the same direction the internal teeth 19 of the gear 16 mesh with the teeth of the gear 10, thereby establishing direct driving relation between the gear 10 and the drive shaft 11. This is the high gear position of the transmission mechanism. It is apparent that, as the sleeve 14 is moved from the left position shown in Figure 6 to the extreme position at the right, the gears are enmeshed progressively in the different ratios from low to high, the intervals during which the gears on the sleeve 14 do not intermesh with the gears on the sleeve 5 and with the gear 10 which define the neutral positions being so short that there is substantially no lost motion between one enmeshed position of the gears and the next, so that very little differential movement between the engine and vehicle is produced during the shifting interval, the result being that there is no clashing of gears, nor is it necessary for the driver of the vehicle to use his judgment as to the correct relative speeds of motor and vehicle at which the shift of gears should be made.

The yoke 18 is slidably mounted in a slotted guideway 20 formed in a preferably two-part casing 21 which is attached in any desired manner to the side of the gear box, the latter being provided with a slot in registry with the slotted guideway, to permit extrusion of the arm 22 which forms part of said yoke. Within the guideway slides a rack bar 23. The range of movement permitted the rack bar by the length of the slotted guideway and of the slot in the side of the gear box is such as to permit the sliding-gear sleeve 14 to travel from its reverse position on the left to the high gear position on the right (Figure 6).

The rack bar is operated by means of a gear 24 carried on the lower portion of a vertical stub shaft 25 journalled in bearings in the upper and lower parts of the casing 21. A lever 26 is keyed or otherwise secured to the upper projecting end of the stub shaft 25, which, through a system of linkage including the rod 27, bell-crank lever 28, rod 29, and lever 30 is operatively connected to a stub shaft 31 carried in a fitting 32 stationarily mounted with respect to the frame of the auto vehicle, said shaft being oscillated by a handle 33 arcuately movable concentrically of the steering wheel of the auto vehicle, which rotates a tube 34 extending through the steering column and connected with the stub shaft 31 by intermeshing sectors 35 and 36.

The handle 33 moves across a quadrant upon which the several positions of gear shift are suitably indicated, beginning with reverse at the left hand movement of said handle and continuing progressively through low, intermediate and high speed positions, the latter being at the right hand limit of said handle, with a neutral position between each of the forward speed positions. It will be observed from Figure 10 that the handle moves through an arcuate range of 180°, while the angular movement of the gear 24 is appreciably less than a semi-circumference. The linkage connecting said gear with the steering post operating mechanism is so designed as to produce this differential range of angular movement. The usual throttle and spark control levers 37 and 38 may be positioned so as to operate upon the opposite side of the quadrant from the gear shift lever so that a single annular member may serve the purposes of all three levers, as shown.

The gear lock comprises cooperating members including a keeper drum 39 fixed to the stub shaft 25, and a cooperating plunger 40 slidably arranged within a bore 41 in the casing 21, extending radially with respect to the axis of said stub shaft. The drum is provided with notches 42 formed as dihedral angles having vertical apices, the faces of said angles intersecting each other in the circumference of the drum so as to provide edges 43 between adjacent notches. The number of notches equals the number of gear shift positions, including the reverse and all neutral positions. The end of the plunger is formed with a correspondingly tapered end 44 engageable with the notches in such a way that it must find a final seat in one of the notches, it being impossible for it to contact with one of the edges 43 without sliding in one direction or another into a notch. The lock is thus positive and certain in its action and the plunger 40 is operated by means connected with the clutch operating mechanism. It does not seem necessary here to enumerate ate the elements of the clutch or the operating means therefor, these being of usual construction, except to state that the thrust collar 45 is pressed against the thrust-plate 46 by a lever 47 mounted upon a vertical pivot 48 carried by the clutch housing and having a forked inner end 49 embracing the driving shaft and abutting against the rearward face of the thrust collar. The outer end of the lever 47 is loosely connected to a link 50, the forward end of which is connected in similar manner to a bell crank lever 51 carrying the clutch pedal 52. When the clutch pedal is depressed the inner end of the lever 47 is rocked against the thrust collar 45 to engage the clutch in a well known manner.

In order to connect the gear lock with this mechanism I have mounted a post 54 in any suitable manner upon the clutch housing and provided it with a shouldered bolt 55 affording a fulcrum for a bent lever 56, which carries at the end opposite the fulcrum an adjustable link 57 to which the plunger 40 is connected. The lever 56 is operated from the thrust collar of the clutch by means of a pin 58 suitably fixed relatively to said thrust collar and projecting through an aperture in said lever. When the clutch collar is depressed by operation of the clutch pedal the lever 56 is rocked in a direction to permit the plunger 40 to move into locking position with respect to the keeper drum 39. When pressure is removed from the pedal 52 so as to permit the thrust collar 45 to resume its normal position of clutch engagement, the lever 56 swings in the opposite direction releasing the locking means.

It is essential that the shifting of the gears be not attempted until the clutch is completely disengaged, nor should it be possible for the clutch to resume its normal position of engagement until the gears have been completely shifted. This is automatically taken care of by the present invention in which a pin and slot connection is provided between the plunger 40 and the link 57 affording lost motion between said parts, the plunger being normally biased in a locking direction by means of a spiral spring 59. When the clutch collar 45 moves toward release position, the pin 60 moves from one end to the other of the slot 61 before the plunger 40 begins to be withdrawn from the keeper drum 39. When the clutch collar moves towards position of engagement the plunger 40 resumes locked position with the keeper drum 39 before the pin 60 begins to move back to its original position at the opposite end of the slot 61. While I have provided the slot in the link 57, it is to be understood that the parts might be reversed, the pin being carried by said link and the slot being formed in the plunger 40. Although the present invention will probably find its greatest field of usefulness in power plants designed particularly for its installation, yet it is readily adaptable to existing types of gear shift, principally by the substitution of the unitary sliding-gear sleeve 14 for the sliding gears found in the conventional gear box, and the attachment of the casing 21 to the side of the gear box, the latter being suitably slotted. The adaptation of the specific elements essential to the operation of my invention, in present-known installations requires a comparatively little redesigning or reconstruction of the several parts.

It is to be understood that, while I have herein disclosed an illustrative embodiment of my invention, the invention is not confined to the specific structure shown, but is capable of wide variation in the form and arrangement of parts, being restricted only by such limitations as are expressly defined in the appended claims.

Having described my invention what I claim as new and desire to secure by Letters Patent, is:—

1. In transmission gear, a gear box, a lay shaft supported within said gear box, a sleeve journalled thereupon having spaced gears of different size driven from an engine operated gear, a sliding gear unit within said gear box in operative relation to said driven gears, one side of said gear box being formed with a slot, a casing secured to said gear box having a slot registering with the slot in said gear box, said casing being formed with a guideway, a rack bar in said guideway having a portion projecting through said slots into said gear box, a yoke on said portion engaging said sliding gear unit for actuating the same, a gear journalled within said casing meshing with said rack bar, a hand lever ultimately connected to said last named gear and clutch actuated locking means for locking said gear against rotation while the clutch is in engagement.

2. In transmission gear, a gear box, a sleeve journalled thereupon having spaced gears of different size driven from an engine operated gear, a sliding gear unit within said gear box in operative relation to said driven gears, one side of said gear box being formed with a slot, a casing secured to said gear box having a slot registering with the slot in said gear box, said casing being formed with a guide-way, a rack bar in said guideway having a portion projecting through said slots into said gear box, a yoke on said portion engaging said sliding gear unit for actuating the same, a gear journalled in said casing, a hand lever ultimately connected to said last named gear, a clutch actuated locking means for locking said gear, said locking means including a drum fixed relatively to said last named gear having peripheral indentations corresponding to all speed and neutral positions of said gear shift, and a plunger slidably mounted in said casing having the end thereof engageable within said indentations, and means responsive to the operation of the clutch of the auto vehicle for withdrawing said plunger from said drum to release said gear shift, said means being constructed to positively retain said gear shifting means in locked position during the period of clutch engagement and for a period succeeding the initial clutch release movement and preceding the final movement of clutch engagement.

3. In transmission gear, a gear box, gear shifting mechanism within said gear box, one side of the latter being formed with a slot, a casing secured to said gear box having a slot registering with the slot in said gear box, said casing being formed with a guideway, a rack bar in said guideway having a portion projecting through said slots into said gear box into operative relation to said gear shifting mechanism, a gear journalled within said casing meshing with said rack bar, a hand lever ultimately connected to said last named gear, and clutch actuated locking means including a drum fixed relatively to said last named gear having peripheral indentations corresponding to all speed and neutral positions of said gear shift, and a plunger slidably mounted in said casing having the end thereof engageable within said indentations, said plunger being normally spring-pressed against said drum, and means responsive to the operation of the clutch of the auto vehicle for withdrawing said plunger from said drum to release said gear shift, said means having lost motion, permitting initial operation of the clutch release means before withdrawing the plunger against spring pressure and permitting the return of said plunger under spring pressure before the final movement of clutch engagement.

In testimony whereof I have hereunto set my hand.

GEORGE O. HOWETH.